No. 889,514. PATENTED JUNE 2, 1908.
J. FAIR.
GEARING.
APPLICATION FILED DEC. 12, 1906.

Witnesses
Frank B. Hoffman
D. S. Elmore

Inventor
John Fair

By Victor J. Evans
Attorney

UNITED STATES PATENT OFFICE.

JOHN FAIR, OF NEWPORT NEWS, VIRGINIA.

GEARING.

No. 889,514.  Specification of Letters Patent.  Patented June 2, 1908.

Application filed December 12, 1906. Serial No. 347,545.

*To all whom it may concern:*

Be it known that I, JOHN FAIR, a citizen of the United States, residing at Newport News, in the county of Warwick and State of Virginia, have invented new and useful Improvements in Gearing, of which the following is a specification.

This invention relates to friction gearing of the class utilized for example in saw mills for operating the saw and its work feeding carriage, and which embodies a drive shaft, a driven shaft and a connecting shaft arranged counter to the first named shafts to which it is operatively connected, for driving one from the other, through the medium of pairs of coöperating friction wheels or disks.

The invention is directed especially to an adjusting or controlling device for maintaining the friction wheels in proper operative engagement and has for its object to provide a simple, efficient device of this character which may be inexpensively installed for use, one whereby the requisite amount of friction may be maintained between the disks for properly operating the carriage, and one in the operation of which the friction may be varied at will to accord with the weight of the load on the carriage, thus adapting the latter for moving light weight or heavy loads with equal facility or for stopping the feeding of the carriage independently of the operation of the saw.

With these and other objects in view, the invention comprises the novel features of construction and combination of parts more fully hereinafter described.

Figure 1:
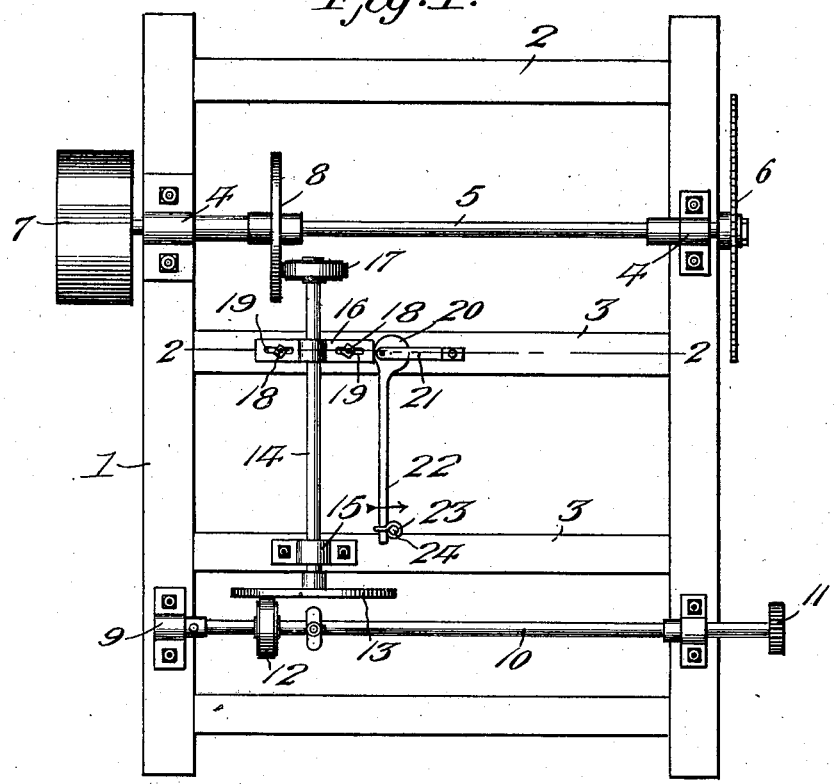
Figure 2:
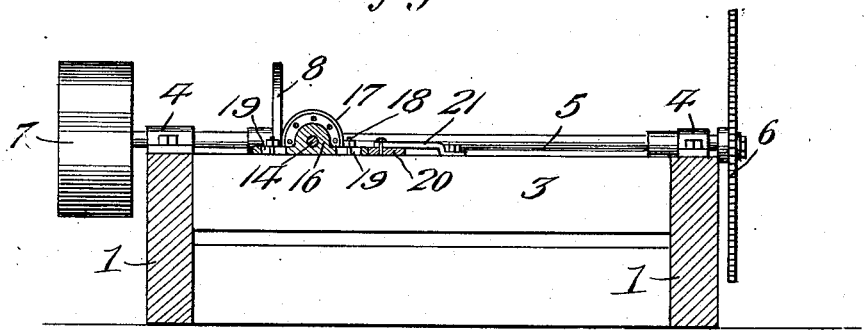
Figure 3:
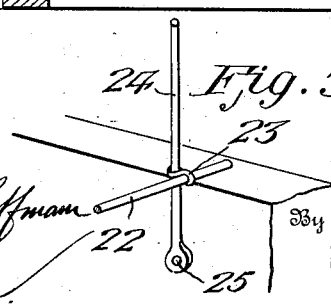

In the accompanying drawings: Figure 1 is a top plan view of a saw and carriage operating mechanism having the invention embodied therein. Fig. 2 is a vertical, transverse section taken on the line 2—2 of Fig. 1. Fig. 3 is a detail, perspective view of parts of the device.

Referring to the drawings, it will be seen that the gearing to which the invention is applied embodies a frame comprising side bars 1, end bars 2, and intermediate cross pieces or bars 3, while journaled in suitable bearings 4 on the frame is a main drive shaft 5 on which is fixed the saw 6 and which is equipped with a belt pulley 7 and a friction head or disk 8, there being also journaled on the frame in bearings 9 a carriage operating shaft 10 equipped at its outer end with a toothed carriage operating pinion 11 and between its ends with a friction pulley 12 disposed to be acted upon by a friction wheel or disk 13 fixed upon the adjacent end of a countershaft 14 journaled in bearings 15 and 16 and having fixed upon its other end a friction wheel or pulley 17 disposed to be acted upon by the head or disk 8 for operating the countershaft to drive the shaft 10.

In the operation of the foregoing mechanism, which is conventionally shown herein and of the usual construction, the shaft 5 is driven from any suitable source of power, not shown, thus to operate the saw 6 and at the same time transmit motion through the medium of the countershaft and intermediate gearing to shaft 10 by which the carriage, not shown, is moved owing to engagement of the toothed pinion 11 with a rack on the carriage, as usual in devices of this class, it being mentioned that heretofore in the operation of these mechanisms it has been found that when sufficient pressure is exerted in proper engagement with pulley 17 by the usual screw adjustment to operate the carriage when moving a heavy load, the tendency has been to heat the journal which sustains the back pressure; and when this pressure is reduced to the point when the parts will run cool, the mechanism proves inadequate to properly move the carriage owing to lack of sufficiently strong frictional engagement between the disk 8 and pulley 17, resulting in the necessity of great waste of time and at some danger in the loosening of bolts and changing the pressure.

In accordance with my invention and in order to overcome the above noted objection the bearing 16 is movably connected with the frame piece 3 through the medium of fastening members or bolts 18 entered through slots 19 formed in the bearing, adjacent to the outer end of which there is eccentrically pivoted a cam member or head 20 fixedly held in place by means of a bearing member or strap 21 attached to the cross piece 3 and having a projecting arm 22 connected at its outer end by means of a link 23 with a vertical operating lever 24 in turn pivoted at its lower end, as at 25, to the adjacent cross bar 3.

In practice, the parts stand normally in the position illustrated in Fig. 1. When, however, the operator for any reason wishes to change the frictional pressure between the disks or stop the feed works independently, the lever 24, which is convenient to his hand, is easily and quickly moved, as in Fig. 1, thus causing the cam head 20 to act upon the adjacent end of the bearing 16 for moving shaft 14 transversely and acting upon the pulley 17 for regulating at will the frictional engagement with the disk 8, it being understood, of course, that the shaft 14 has sufficient movement with its pivoted bearing 15 to permit of this operation. It will be thus seen that through the medium of the lever 24 and the cam or lever operated thereby, the friction between the parts of the gearing may be regulated at will to accord with the weight of the load on the carriage, and when not in use the feed works may be stopped entirely without stopping the mill, thus not only greatly relieving the wear and tendency to heat but effectually overcoming one source of great danger in the starting of the carriage when the operator is not within reach of the levers and also in changing the amount of friction when the mechanism is all in operation.

Having thus described my invention, what I claim is:

1. In mechanism of the class described the combination of a pair of shafts, a friction element for each shaft, a counter-shaft, friction elements carried by the counter-shaft to engage those of the first mentioned shafts, a movable bearing for said counter-shaft adapting it to be shifted laterally, the cam coacting with such bearing to shift the counter-shaft, a lever arm connected to the cam, and a lever connected to said lever arm to operate the latter.

2. The combination of a pair of shafts, a friction element for each shaft, a counter-shaft, friction elements carried by the counter-shaft to engage those of the first mentioned shafts, a shiftable bearing for such counter-shaft, a cam coacting with the shiftable bearing to shift the counter-shaft transversely, a lever arm connected to the cam, and means for operating said lever.

3. In mechanism of the class described the combination of a pair of shafts, a friction element for each shaft, a counter-shaft, friction elements carried by the counter-shaft to engage those of the first mentioned shafts, a shiftable bearing for the counter-shaft, a pivotally mounted bearing, a cam pivotally connected thereto and coacting with the shiftable bearing to operate the latter, and means to operate said cam.

In testimony whereof, I affix my signature in presence of two witnesses.

JOHN FAIR.

Witnesses:
 RAYMOND M. HUDSON,
 JAMES M. WOLFORD.